(12) United States Patent  (10) Patent No.: US 7,581,330 B1
Redmond  (45) Date of Patent: Sep. 1, 2009

(54) GAUGE DEVICE FOR MEASURING THE INNER DIAMETER OF ENGINE RELATED BORES

(76) Inventor: David W. Redmond, 135 Lakeland Cir., Fayetteville, GA (US) 30215

( * ) Notice: Subject to any disclaimer, the term of this patent is extended or adjusted under 35 U.S.C. 154(b) by 0 days.

(21) Appl. No.: 12/011,683

(22) Filed: Jan. 29, 2008

(51) Int. Cl.
*G01D 21/00* (2006.01)
*G01B 5/12* (2006.01)

(52) U.S. Cl. .......................... 33/611; 33/542; 33/544.5; 33/555.1

(58) Field of Classification Search .................. 33/600, 33/603–605, 542, 543, 544, 544.2, 544.3, 33/544.5, 544.6, 549, 555, 555.1, 644, 710, 33/712, 827, 828, 832, 833, 836
See application file for complete search history.

(56) References Cited

U.S. PATENT DOCUMENTS

| 2,095,405 | A | * | 10/1937 | Aldeborgh et al. | ......... 33/544.6 |
| 2,565,844 | A | * | 8/1951 | Eisele | ................. 33/544.6 |
| 2,654,157 | A | * | 10/1953 | Eisele | ................. 33/544.5 |
| 2,830,375 | A | * | 4/1958 | Zwayer | ................. 33/544.6 |
| 2,930,134 | A | * | 3/1960 | Bishop et al. | ............... 33/544.5 |
| 4,288,924 | A | * | 9/1981 | Mizuno et al. | ................. 33/794 |
| 4,419,830 | A | * | 12/1983 | Miller | ......................... 33/558 |
| 4,977,681 | A | * | 12/1990 | Jiles | ......................... 33/544.5 |
| 5,873,173 | A | | 2/1999 | Redmond | |

* cited by examiner

*Primary Examiner*—Amy Cohen Johnson
(74) *Attorney, Agent, or Firm*—Marvin L. Moore

(57) ABSTRACT

A gauge device for measuring the inner diameter of engine related bores comprising a circular body member having a circumferential surface with a cylindrical chamber totally encased therein along a longitudinal axis. A slide pin is housed within the cylindrical chamber which partially extends through upper and lower openings within the circumferential surface. A top flange extends radially from the upper portion of the body member and having a cylindrical dial mount affixed to the front. Disposed equidistance to each side of the top flange is a secondary flange extending radially from the front of the body member each embedded with a magnetic disk. A vertical slot positioned along the longitudinal axis provides the plunger stop means access to the slide pin. A dial indicator means is operatively connected within the dial mount and having a movable plunger extending downward and housed within a spring member which abuts the plunger stop means.

11 Claims, 4 Drawing Sheets

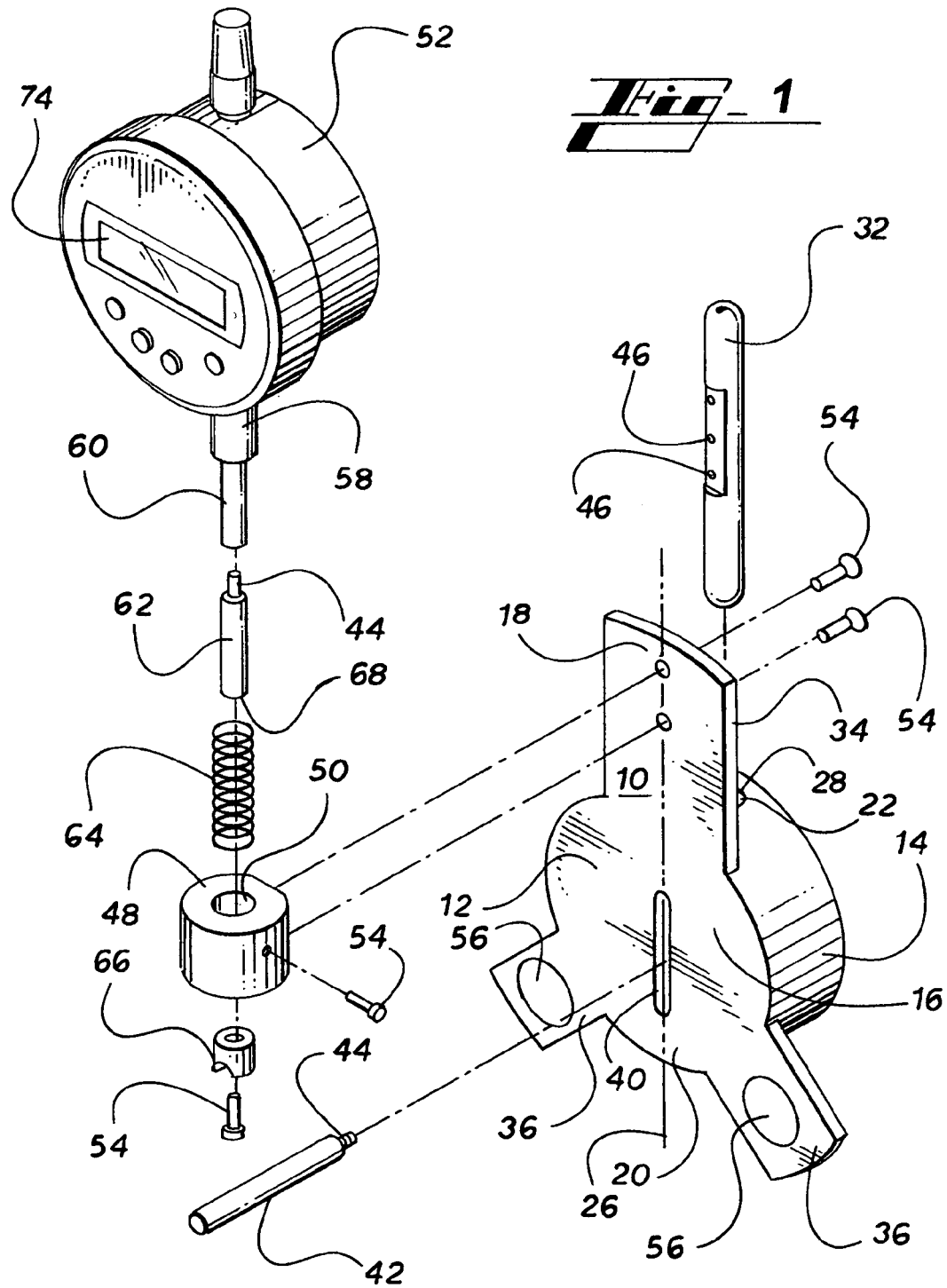
Fig_1

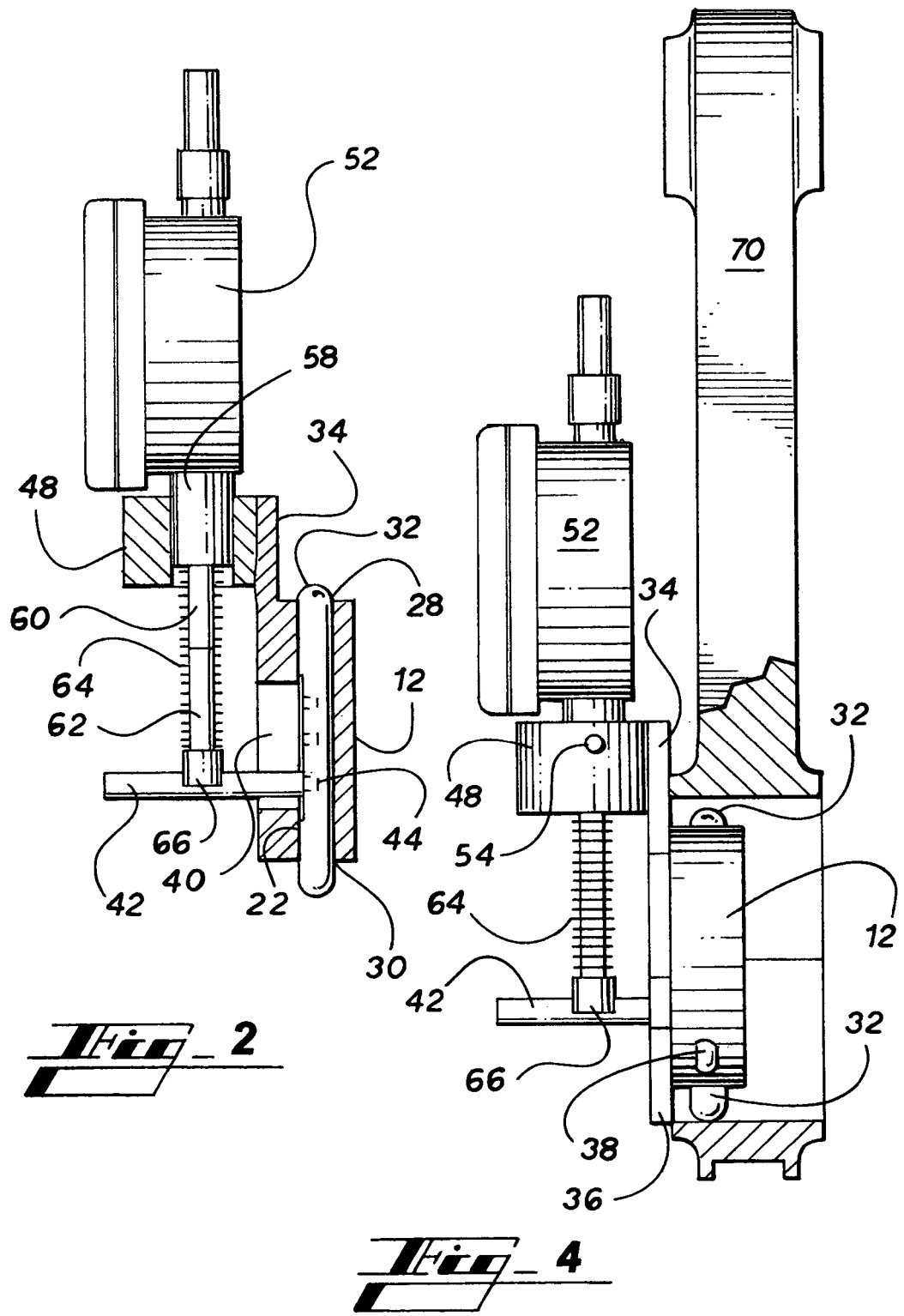

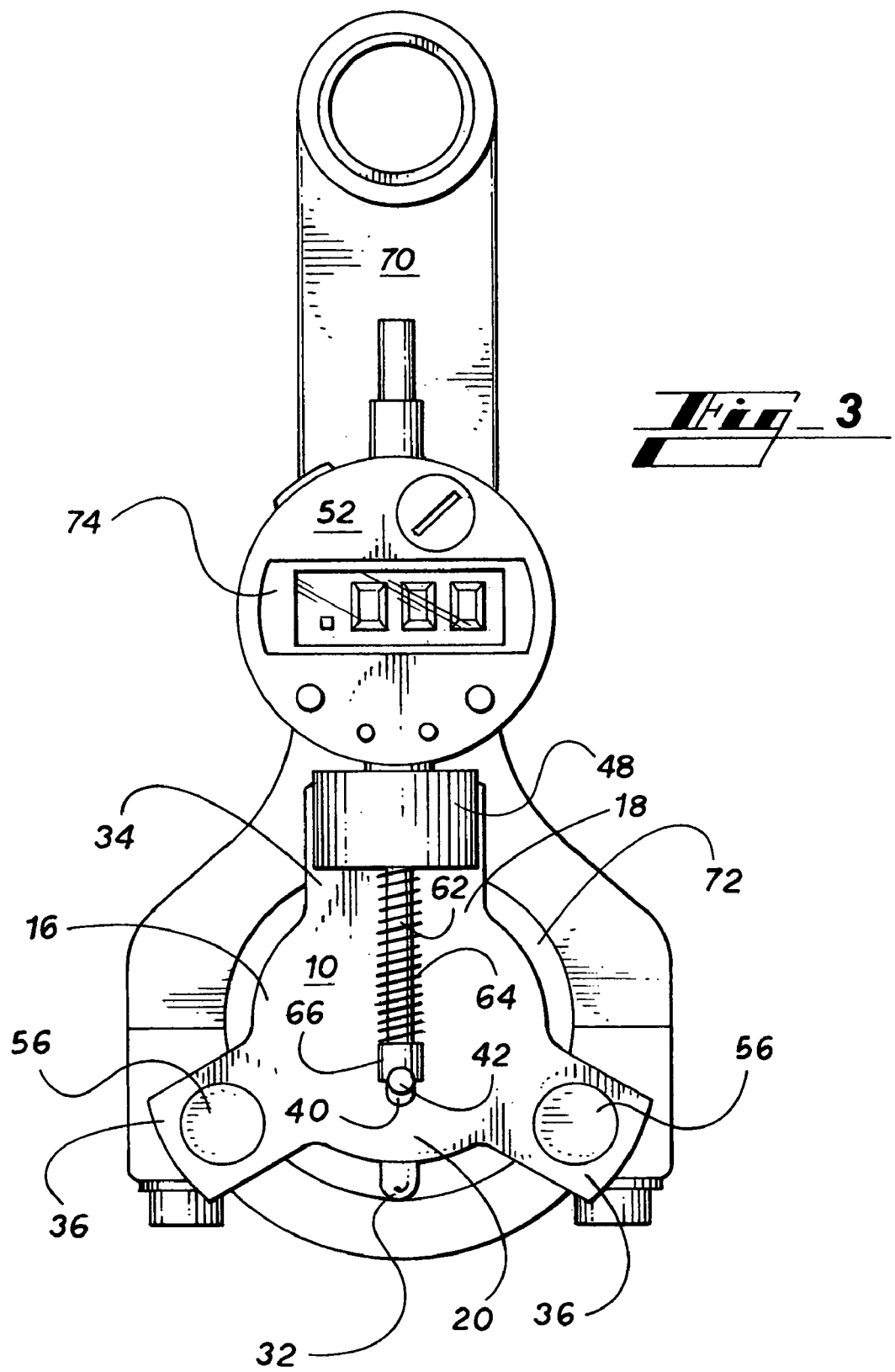
Fig_3

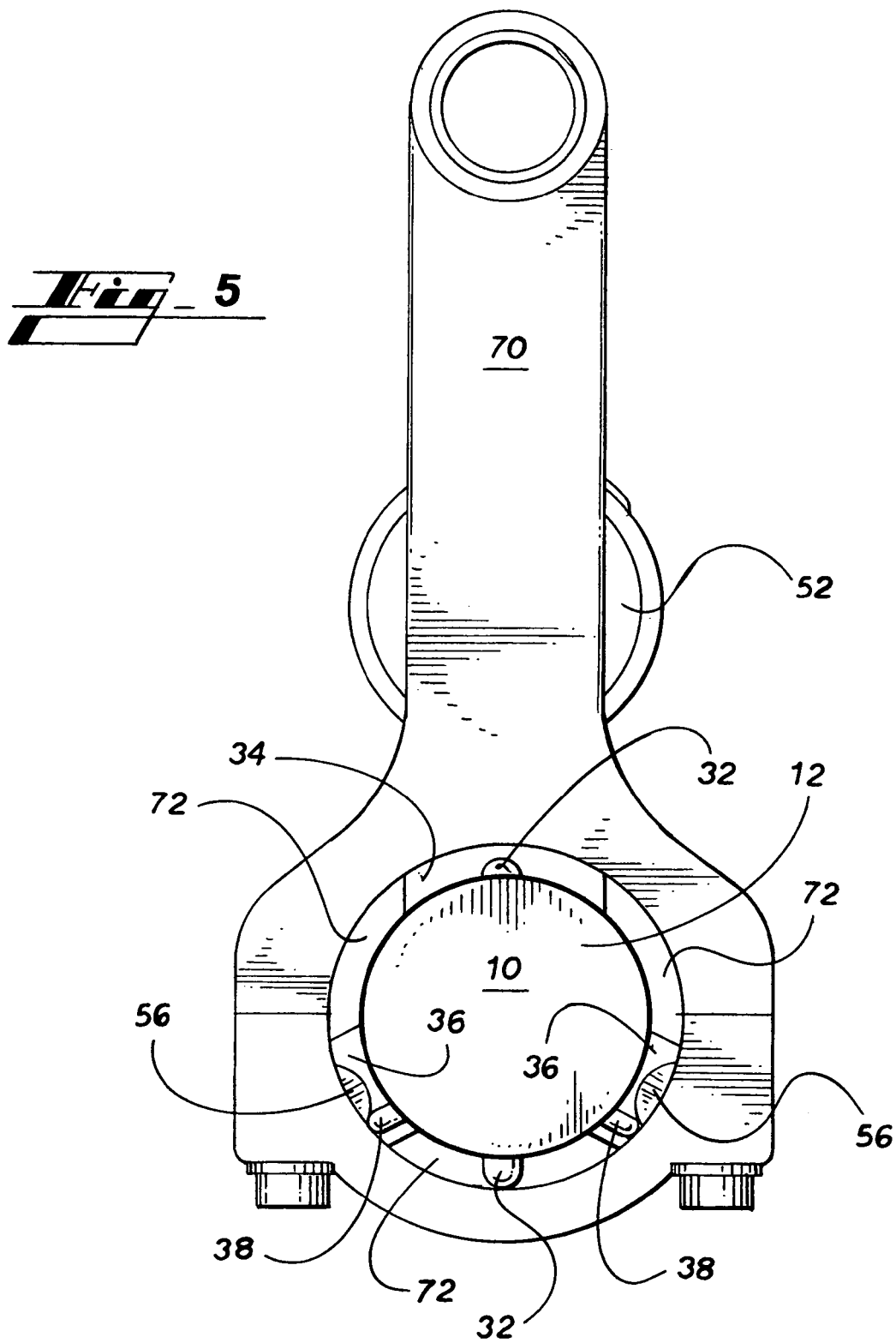
Fig_5

GAUGE DEVICE FOR MEASURING THE INNER DIAMETER OF ENGINE RELATED BORES

FIELD OF THE INVENTION

The present invention relates generally to a gauge device for measuring the inner diameter of engine related bores and more specifically a gauge device for measuring the crank pin bore of an engine connecting rod and the crank shaft main bore in an engine block.

BACKGROUND OF THE INVENTION

Heretofore calipers or caliper type devices have been provided for measuring the inner diameter of engine related bores. Typical of these prior devices are basic calipers in combination with a micrometer. The user spans the bore to be measured with a snap gauge then measures the snap gauge span with a micrometer. A further device uses calipers in connection with an attached dial indicator. Any movement in the caliper jaws causes a corresponding movement in the indicator.

A disadvantage of taking measurements with caliper type devices and snap gauges is that the user must guess where to properly place the tips of the caliper and snap gauge to achieve an accurate measurement of the bore's diameter. This can result in the user inaccurately measuring a chord of the bore in lieu of its true diameter.

U.S. Pat. No. 5,873,173 issued to Redmond discloses a device for measuring vertical clearance and length of engine connecting rods in which determining diameter of the pin bore and wrist pin eye is critical for measuring the vertical clearance.

Though this device can be used to measure the inner diameter of the crank pin bore its shortcoming is the inability to also measure bores within an engine block. A further disadvantage is that the device disclosed in Redmond requires a horizontal surface on which to place the device when in operation.

While the prior art devices would appear to operate reasonably well and generally achieve their objectives under the limited range of operating conditions for which they were designed they embody one or more of the aforesaid drawbacks.

There remains a need for a device which allows the operator to accurately measure diametrically opposite points within a bore. Additionally, there remains a need for a single device which can be used to measure the inner diameter of various engine related bores in real numbers.

SUMMARY OF THE INVENTION

It is therefore an object of the present invention to provide a single gauge device for measuring the inner diameter of the crank pin bore of an engine connecting rod and also the crank shaft main bore in an engine block in real numbers.

It is an additional object of the present invention to provide a device designed to specifically avoid measuring a chord of the bore in lieu of its true diameter.

It is a further object of the present invention to provide a device requiring minimal instruction for operation.

The present invention provides a gauge device for measuring the inner diameter of engine related bores. The gauge device comprises a circular body member having a circumferential surface with a cylindrical chamber therein and along a longitudinal axis. A slide pin is housed within the cylindrical chamber which partially extends through the chamber's upper and lower opens. A top flange extends radially from the front face of the body member and adjacent to the upper opening of said cylindrical chamber and further having a cylindrical dial mount affixed to the front. Disposed equidistance to each side of the top flange is a secondary flange extending radially from the front face of the body member each embedded with a magnetic disk. A dial indicator means is operatively engaged within the cylindrical dial mount and having a movable plunger extending downward housed within a spring member which abuts the plunger stop means. A vertical guide slot of substantial length is disposed on the front face of said body member along the longitudinal axis which provides the plunger stop means access to the slide pin.

The gauge device is used as follows. First, the device is positioned within the diameter of an engine related bore and having the flanges rest on the bore's outer rim. The bearing pins of the gauge device are engaged with the inner surface of the measured bore. The magnetic disk embedded within each secondary flange is used to secure the device to the rim of the bore. The slide pin, having a predetermined standard length, in the initial position abuts the inner crown of the bore. The plunger stop means is then urged vertically within the vertical guide slot until the slide pin is in contact with a diametrically opposite point on the opposite wall of the measured bore.

Other aspects, objects, features, and advantages of the present invention will become apparent to those skilled in the art upon reading the detail description of preferred embodiments in conjunction with the accompanying and appended claims.

DESCRIPTION OF THE DRAWINGS

In the drawings, which are discussed below, the same reference numerals refer to the same features of the invention throughout the drawings. A gauge device for measuring the inner diameter of engine related bores, according to the preferred embodiment of the invention is, shown in FIGS. 1-5.

FIG. 1 represents an isometric view of the gauge device for measuring the inner diameter of engine related bores assembled in accordance with the principles of the present invention.

FIG. 2 represents a side view of the gauge device for measuring the inner diameter of engine related bores, showing a cross sectional view of the circular body member, assembled in accordance with the principles of the present invention FIG. 3 represents a front view of the gauge device for measuring the inner diameter of engine related bores in operative relation to a crank pin bore of an engine connecting rod positioned in accordance with the principles of the present invention.

FIG. 4 represents a side view of the gauge device for measuring the inner diameter of engine related bores in operative relation to a crank pin bore of an engine connecting rod positioned in accordance with the principles of the present invention.

FIG. 5 represents a rear view of the gauge device for measuring the inner diameter of engine related bores in operative relation to a crank pin bore of an engine connecting rod positioned in accordance with the principles of the present invention.

DETAILED DESCRIPTION OF THE INVENTION

While the specification concludes with claims particularly pointing out and distinctly claiming the subject matter which is regarded as the invention, the invention will now be described by reference to the following description of preferred embodiment taken in conjunction with the accompanying drawings.

Referring now to the drawings and particularly FIG. 1, there is shown an isometric view of the gauge device for measuring the inner diameter of engine related bores generally designated by the numeral 10 constructed according to principals of the present invention. The present device 10 in its broadest context, has as its components a circular body member 12 having a cylindrical chamber 22 with a slide pin housed within the cylindrical chamber 22, and a vertical slot 40 disposed on the front face 16. The device 10 is further defined by a top flange 34, and disposed equidistance to each side of the top flange 34 is a secondary flange 36. Additionally, the top flange 34 has a dial mount 48 which receives a dial indicator means 52. The indicator means 52 has a movable plunger 60 housed within a coil spring member 64 and extending downward until it abuts the plunger stop means 42.

The circular body 12 has a diameter substantially less than that of the measured engine bore to allow the circumferential surface 14 of the circular body 12 to be inserted therein. In addition, the depth of the circumferential surface 14 of the circular body 12 is substantially less than that of the measured bore. Totally encased within the circular body 12 and along a longitudinal axis 26 is a cylindrical chamber 22 which extends through the circumferential surface 14 to create an upper 28 and a lower 30 opening as depicted in FIG. 2. Centered on the front face 16 and along said longitudinal axis 26 is a vertical slot 40 of substantial length which partially exposes the hollow cylindrical chamber 22 to the front face 16.

A top flange 34 is disposed at the upper portion 18 of the longitudinal axis 26 and adjacent to the upper opening 28 of the cylindrical chamber 22 which extends radially from the front face 16 of the circular body member 12. Disposed equidistance to each side of the top flange 34 is a secondary flange 36 extending radially from the front face 16 of the circular body 12. Accordingly, the flanges are in symmetric orientation around the circumference of the circular body 12 front face 16. Additionally, all flanges 34 and 36 are substantially square in shape and substantially thinner than the circumferential surface 14 and act as a shelf on which the gauge device 10 rests when in operation. Also, adjacent to each secondary flange 34 and 36 is a bearing pin 38 which projects from the circumferential surface 14 of the body member 12.

It should be understood that all component parts comprising the circular body 12 are made as a unitary structure and of a material of sufficient strength to withstand any impact encountered during normal operation. Preferably the body 12 is cast from aluminum.

The top flange 34 further has affixed to the front face 16 a cylindrical dial mount 48 having a central opening 50 of sufficient diameter to receive the mounting collar 58 of the dial indicator means 52. Further, each secondary flange 36 is embedded with a magnetic disk 56 the purpose of which will later become apparent.

A slide pin 32 is housed within the cylindrical chamber 22 and extends partially through the chamber's upper 28 and lower 30 opening. The slide pin 32 further has a diameter slightly less than that of the cylindrical chamber 22 which acts as a guide for reciprocal movement of the slide pin 32 within the circular body 12. The slide pin 32 also has a predetermined known standard length. Additionally, the slide pin 32 has at least one threaded opening 46 facing the vertical guide slot 40 which is initially positioned at the lower portion 20 of the longitudinal axis 26 as seen in FIG. 2. The plunger stop means 42 extends through the vertical slot 40 in perpendicular relation to the circular body 12 front face 16 and has an externally threaded end 44 which is received by the threaded opening 46 of the slide pin 32.

A dial indicator means 52 has a mounting collar 58 which is operatively engaged within the cylindrical dial mount opening 50 and fixed in place with a set screw 54. The dial indicator means 52 has a movable plunger 60 wherein any movement of said plunger 60 causes a corresponding measurable movement in the dial visual display 74. The plunger further projects through the cylindrical dial opening 50 and housed within a coil spring member 64. At the plunger terminus is an end cap 66 which abuts the plunger stop means 42 resting at the lower portion 20 of the vertical guide slot 40 when the gauge device 10 is in the initial position as seen in FIG. 2. If needed, a movable plunger extension 62 of sufficient length may be added to the movable plunger 60 to span the distance required to reach the plunger stop means 42. The extension has an externally threaded end 44 which is received by the threaded opening 46 of the movable plunger 60 and is also housed within the coil spring member 64 as shown in FIG. 1.

The use of the gauge device 10 can best be illustrated in operative connection with a crank pin bore 72 of an engine connecting rod 70 as depicted in FIGS. 3-5. The dial indicator means 52 is initially calibrated so that the visual display 74 reads zero. The circular body member 12 of the gauge device 10 is then positioned within a bore 72 with the front face 16 and dial indicator visual display 74 facing the user. The top flange 34 and the magnetic disk 56 embedded within the secondary flanges 36 rests on the outer rim of the measured bore to secure the device 10 in position. The bearing pins 38 and slide pin 32, by way of the lower opening 30, are engaged with the crown of the bore as illustrated in FIG. 5.

As the plunger stop means 42 is urged toward the upper portion 18 of the vertical guide slot 40, depressing the movable plunger 60 and coil spring member 64, the slide pin 32 simultaneously moves upward within the cylindrical chamber 22 and through the upper opening 28. Once the slide pin 32 is in contact with a diametrically opposite point on the inner wall of the bore the measurement from the dial indicator visual display 74 is recorded. The measurement recorded plus the predetermined known standard length of the slide pin 32 define the measured bore's diameter.

It should be further understood that though the use of the gauge device is shown in connection with the crank pin bore of an engine connecting rod for illustrative purposes the present device is also adopted to measure the inner diameter of various engine bores including the crank shaft main bore.

From the preceding, it should be evident that the invention has satisfied a need in providing an improved means for measuring engine related bores. The device affords a precise means for measuring the crank pin bore of an engine connecting rod as well as measuring the crank shaft main bore in an engine block.

As should be apparent from the foregoing specification, the invention is susceptible to being modified with various alterations which may differ from those which have been described in the proceeding specification and description. Accordingly, the following claims are intended to cover all alterations and modifications which do not depart from the sprit of the invention.

LIST OF NUMBERS

This list is for convenience in referring to the drawings. It is not intended to be part of the patent application.

| | |
|---|---|
| 10 | Gauge Device |
| 12 | Circular Body Member |
| 14 | Circumferential Surface |
| 16 | Front Face |
| 18 | Upper Portion |
| 20 | Lower Portion |
| 22 | Cylindrical Chamber |
| 24 | (reserved) |
| 26 | Longitudinal Axis |
| 28 | Cylindrical Chamber Upper Opening |
| 30 | Cylindrical Chamber Lower Opening |
| 32 | Slide Pin |
| 34 | Top Flange |
| 36 | Secondary Flange |
| 38 | Bearing Pin |
| 40 | Vertical Guide Slot |
| 42 | Plunger Stop Means |
| 44 | Externally Threaded End |
| 46 | Threaded Opening |
| 48 | Cylindrical Dial Mount |
| 50 | Cylindrical Dial Mount Opening |
| 52 | Dial Indicator Means |
| 54 | Set Screw |
| 56 | Magnetic Disk |
| 58 | Mounting Collar |
| 60 | Movable Plunger |
| 62 | Movable Plunger Extension |
| 64 | Coil Spring Member |
| 66 | End Cap |
| 68 | Extension Plunger Terminus |
| 70 | Connecting Rod |
| 72 | Crank Pin Bore |
| 74 | Dial Indicator Visual Display |

What is claimed:

1. A gauge device for measuring the inner diameter of engine related bores comprising:
   i. a circular body member having a circumferential surface and a front surface whereby within said body member is disposed a cylindrical chamber along a longitudinal axis creating an upper and a lower opening within said circumferential surface;
   ii. a slide pin housed within said cylindrical chamber;
   iii. a top flange extending radially from the front surface of the body member adjacent to the upper opening and disposed equidistance to each side of said top flange and extending radially from the front surface is a secondary flange
   iv. at least one bearing pin projects from the circumferential surface;
   v. a vertical guide slot of substantial length disposed on the front face of said body member along said longitudinal axis;
   vi. a plunger stop means having an externally threaded end to be received through the vertical slot perpendicularly to said front face and within a threaded opening in said slide pin;
   vii. a cylindrical dial mount affixed to the front surface of said top flange; and
   viii. a dial indicator means operatively engaged within said dial mount having a mounting collar, a movable plunger housed within a spring member, and an end cap affixed to the plunger terminus in abutting contact with the plunger stop means.

2. The gauge device for measuring the inner diameter of engine related bores according to claim 1 wherein, said circular body member, top flange and secondary flanges are integrated into a unitary structure.

3. The gauge device for measuring the inner diameter of engine related bores according to claim 1 wherein, said flanges are substantially square in shape.

4. The gauge device for measuring the inner diameter of engine related bores according to claim 1 wherein, embedded within each secondary flange is a magnetic disk.

5. The gauge device for measuring the inner diameter of engine related bores according to claim 1 wherein, said slide pin has a predetermined known standard length.

6. The gauge device for measuring the inner diameter of engine related bores according to claim 1 wherein, said spring member is a coil spring.

7. The gauge device for measuring the inner diameter of engine related bores according to claim 1 wherein, said plunger has an extension which is also housed within the spring member.

8. The gauge device for measuring the inner diameter of engine related bores according to claim 1 wherein, said slide pin extends partially beyond each of the upper and lower openings.

9. The gauge device for measuring the inner diameter of engine related bores according to claim 1 wherein, said at least one bearing pin comprises a bearing pin adjacent to each secondary flange.

10. The gauge device for measuring the inner diameter of engine related bores according to claim 1 wherein, said vertical guide slot partially exposes the slide pin within the cylindrical chamber.

11. The gauge device for measuring the inner diameter of engine related bores according to claim 1 wherein, the dial indicator means is operatively fixed within said dial mount with a set screw.

\* \* \* \* \*